(12) United States Patent
Elliot et al.

(10) Patent No.: US 6,889,298 B2
(45) Date of Patent: May 3, 2005

(54) BATTERY-BASED SECURED STORAGE BINDING SYSTEM

(75) Inventors: Scott Thomas Elliot, Raleigh, NC (US); James Patrick Hoff, Raleigh, NC (US); Randall Scott Springfield, Chapel Hill, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/015,814

(22) Filed: Nov. 2, 2001

(65) Prior Publication Data

US 2003/0088748 A1 May 8, 2003

(51) Int. Cl.[7] .............................................. G06F 12/00
(52) U.S. Cl. ........................ 711/163; 713/200; 365/52; 365/228
(58) Field of Search .............................. 365/52, 185.04, 365/227, 228, 185.05, 185.21; 711/163; 713/200, 323; 714/14; 463/29

(56) References Cited

U.S. PATENT DOCUMENTS

| | | | | |
|---|---|---|---|---|
| 5,539,876 A | * | 7/1996 | Saito et al. | .................... 714/14 |
| 5,798,961 A | * | 8/1998 | Heyden et al. | ............... 365/52 |
| 6,374,315 B1 | * | 4/2002 | Okada et al. | ................. 710/62 |
| 6,575,833 B1 | * | 6/2003 | Stockdale | .................... 463/29 |

* cited by examiner

*Primary Examiner*—Pierre M. Vital
(74) *Attorney, Agent, or Firm*—Martin J. McKinley; Dillon & Yudell LLP

(57) ABSTRACT

An apparatus and method for exclusively binding data to a data processing system. The logical binding apparatus of the present invention includes a detachable circuit device mounted within a system planar. Data to be bound within the system planar is stored in a memory device within the detachable circuit device. A battery signal is applied from the system planar to a binding pin on the detachable circuit device, wherein the binding pin is applied to the input of a binding latch. The binding latch remains in a reset state while the battery signal is applied. Upon removal of said binding signal from the binding pin, the binding latch is set thus signaling a processing unit within the detachable circuit device to remove the data from the memory device.

18 Claims, 3 Drawing Sheets

BATTERY-BASED SECURED STORAGE BINDING SYSTEM

BACKGROUND OF THE INVENTION

1. Technical Field

The present invention relates in general to data processing systems, and in particular to data security within such systems. More particularly, the present invention relates to an apparatus and method for logically binding data to a fixed location within a data processing system.

2. Description of the Related Art

Computer security encompasses a number of different aspects, from passwords and permissions, to data encryption, virus protection, firewalls, and VPNs, software bugs, data backup and physical system security. The continued growth in electronic communication and commerce over expansive computer-driven networks has resulted in a dramatic proliferation of potential security data security problems as data is stored and delivered over multiple networked devices.

Specialized security hardware that complements transmission-based security has been developed to address the myriad of potential security threats to stored and/or transmitted digital data. Such complementary hardware security addresses hardening and assuring the integrity of the environment in which digital application data resides. This security hardware can be utilized for a number of purposes including securing storage of confidential information such as security keys, and off-loading of intensive security operations such as Secure Socket Layer (SSL) processing or digital signature operations. So called "smart cards" and hardware tokens are among the most common forms of secured hardware storage. These mechanisms are tamper-resistant, preventing unauthorized access to security keys. Hardware security devices can also perform cryptographic operations solely from within a system thus providing both a secure environment to access of confidential data, as well as being able to off-load processor intensive operations from network devices.

One such hardware security device is known as an embedded security system (ESS), which provides system security measures outside the interactive processing environment (i.e. the operating system). As depicted in FIG. 1, an ESS 102 is typically an integrated circuit chip that is permanently coupled (typically soldered) to a planar (e.g. a motherboard) 104 within a data processing system 100. Preferably, ESS 102 is uniquely associated with planar 104 such that ESS 102 is not transferrable to another planar. To this end, one function of ESS 102 is to verify the identity of its host planar 104.

ESS security is not universally required and implementation with all data processing systems, particularly personal computers (PCs), personal data assistants (PDAs), poses additional unnecessary overhead costs to low profit margin products. A possible solution is to provide a removable installation site for optional ESS devices. While this approach provides greater flexibility for customers, it poses an unacceptable security risk for applications, such as public/private key transactions, in which specific data must be associated with a particular data processing system with absolute assurance.

Referring back to FIG. 1, another problem with conventional ESS security is that it provides a relatively inadequate barrier for assuring that sensitive data is uniquely associated with a particular data processing system. As explained above, ESS 102 is typically soldered onto planar 104. ESS 102 can potentially be desoldered and removed from planar 104, and installed onto another data processing system, thus compromising the security of data within ESS 102 particularly as this security depends on the need for the object data to be uniquely associated with data processing system 100.

From the foregoing, it can be appreciated that a need exists for a system that will ensure the status of data as being associated with a particular data processing platform. The present invention addresses such a need by providing a logical binding mechanism that avoids the aforementioned problems associated with physical binding mechanisms.

SUMMARY OF THE INVENTION

An apparatus and method for exclusively binding data to a data processing system are disclosed herein. The logical binding apparatus of the present invention includes a detachable circuit device mounted within a system planar. Data to be bound within the system planar is stored in a memory device within the detachable circuit device. A battery signal is applied from the system planar to a binding pin on the detachable circuit device, wherein the binding pin is applied to the input of a binding latch. The binding latch remains in a reset state while the battery signal is applied. Upon removal of said binding signal from the binding pin, the binding latch is set thus signaling a processing unit within the detachable circuit device to remove the data from the memory device.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

As described with reference to FIGS. 2–3, the present invention provides a hardware security means by which data is logically bound to a particular subsystem of a data processing system. The logical binding means of the present invention is particularly useful within the context of a computer network in which it may be important to ensure that particularly sensitive data is uniquely maintained in only one location within the network (i.e. within one designated data processing system).

One such context in which the need for hardware data security arises is in the development and improvement of security key technologies. As part of the security management employed by credit card companies, for example, public/private security key encryption systems are often utilized. Public/private key encryption allows a vendor (a credit card company, for example) to remotely install a private key into a designated user system module in a manner that the vendor is assured that any information intended for the private use of the user is secure.

Implementation of public/private key security systems requires user-side hardware security. The Trusted Computing Platform Alliance (TCPA) is an industry consortium dedicated to improving trust and security on computing platforms. International Business Machines, Inc. (IBM) is included among the companies that founded and continue to develop TCPA specifications and guidelines. The current TCPA specification defines a subsystem so that it may be trusted to interactively operate with other systems in a pre-defined manner. The subsystem includes an isolated computing engine whose processes can be trusted because they cannot be altered locally or via network intrusion. One such security subsystem developed in accordance with TCPA guidelines is known as a Trusted Platform Management (TPM) module. The preferred embodiments of the present invention are described herein in FIGS. 2 and 3 in the context of a data processing system employing a TPM. However, one skilled in the art will understand and appreciate that the underlying principles depicted and explained with reference to FIGS. 2 and 3 are more generally applicable to any application in which there exists a need to bind data to a particular, fixed system location.

Figure 1:
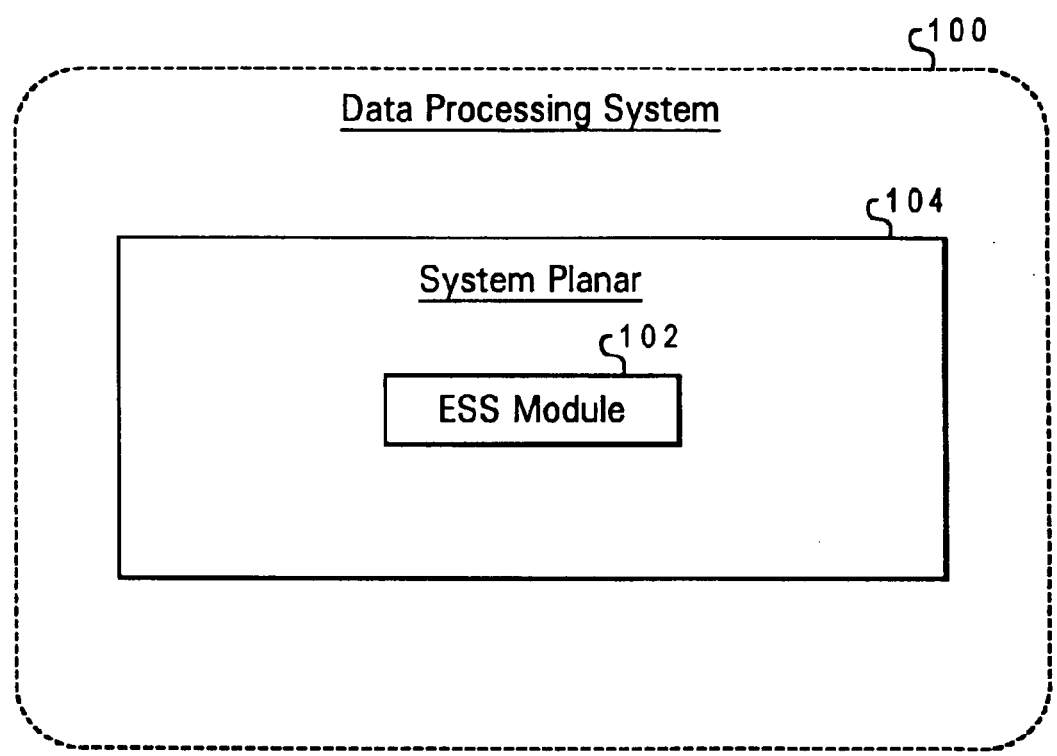
FIG. 1 is a block diagram depicting a conventional hardware security system implemented within a data processing system.
Figure 2:
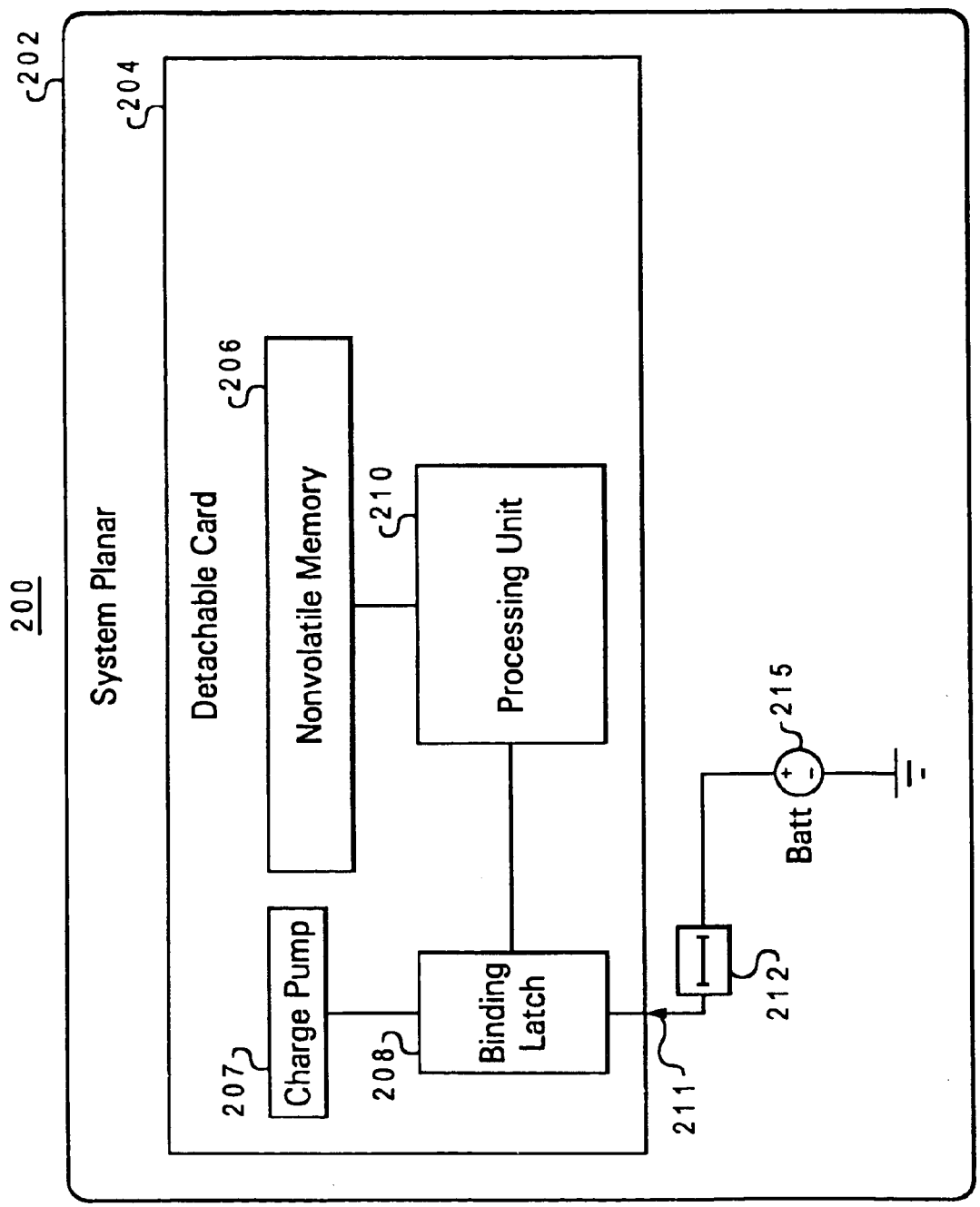
FIG. 2 is a block diagram illustrating a battery-based data security apparatus as may be implemented in a preferred embodiment of the present invention.

With reference now to FIG. 2, there is depicted a block diagram illustrating a battery-based data security apparatus as may be implemented in a preferred embodiment of the present invention. Specifically, a logical binding apparatus 200 is shown that is implemented within a system planar 202 (e.g. a motherboard), which may be utilized within any type of data processing system. As explained below and with reference to FIG. 3, logical binding apparatus 200 is utilized to exclusively bind data to the data processing system (not depicted) in which logical binding apparatus is employed.

As illustrated in FIG. 2, logical binding apparatus 200 includes system planar 202 in which a detachable TPM module card 204 is mounted. A memory device 206 and a processing unit 210 are included within TPM module card 204 to provide a secure interactive data repository in which, for example, private security key data may be established and maintained within the host data processing platform. In accordance with a preferred embodiment, the secure data stored within non-volatile memory device 206 may be received from a remote system, such as a network server (not depicted). Processing unit 210 performs requisite data processing functions required for private key establishment and maintenance. The specifics of private key encryption and decryption are well known in the art and are not discussed herein.

As further depicted in FIG. 2, detachable card 204 further includes a non-volatile storage device, referred to hereinafter as binding latch 208. Processing unit 210 is communicatively coupled with binding latch 208 such that processing unit 210 can determine the logic state (i.e. set or reset) of binding latch 208. As an important feature of the present invention, TPM module card 204 is designed and installed within system planar 202 such that a predesignated binding pin 211 is coupled to the input of binding latch 208.

Although not explicitly illustrated in FIG. 2, a system power supply is utilized to provide power for the operation of circuit components mounted onboard system planar 202. Such system power is typically provided from a host power supply that may be activated and deactivated as determined by a user. In accordance with the depicted embodiment, an alternate dc voltage supply is provided within system planar 202 that provides a constant dc supply independent of the system power supply. Within logical binding apparatus 200, the alternate dc voltage is provided by a battery 215 that is installed within system planar 202.

As further depicted in FIG. 2, battery 215 is coupled to binding pin 211 such that a constant dc voltage level is provided to the input of binding latch 208. In accordance with the depicted embodiment, binding latch 208 remains reset (to a logic low, for example) while the dc voltage level from battery 215 remains at binding pin 211. Binding latch 208 is further designed such that in response to an interruption of the battery signal at binding pin 211, the logic state binding latch 208 is set (to a logic high, for example). A removal of detachable TPM module 204 would, for example, result in such an interruption resulting in binding latch 208 being set.

As part of the hardware security provided by logical binding apparatus 200, processing unit 210 continuously monitors the state (i.e. set or reset) of binding latch 208. Processing unit 210 is programmed to recognize that while binding latch 208 is reset, the security of data stored within non-volatile memory device 206 is assured, and normal processing and maintenance of the data continues. However, in response to detecting that the state of binding latch 208 has changed (i.e. has been set), processing unit commences removing the data stored within non-volatile memory device 206. If, as in the depicted embodiment, processing unit 210 requires a system power supply to operate, the removal of the data content of non-volatile memory device 206 cannot be immediately performed in response to a physical extraction of detachable TPM module 204 from system planar 202. Therefore, in the case that the interruption the battery signal and subsequent setting of binding latch 208 is caused by an event resulting in a loss of power to processing unit 210, the removal of data from non-volatile memory 206 is not performed until detachable TPM module 204 is subsequently installed into system planar 202 or another suitable mounting site. Logical binding apparatus 200, thus ensures that data stored within TPM module 204 is exclusively and continuously bound to a particular mounting site within system planar 202.

Although the foregoing description describes binding latch 208 as a non-volatile memory unit, in an alternate embodiment, a volatile memory storage unit (e.g. a flip flop) may be implemented as the binding latch within detachable TPM module 204. If binding latch 208 is implemented as a volatile memory storage unit, the "set" state of binding latch 208 may be triggered and maintained using a charge pump 207. In this manner, the set state is maintained until detachable TPM module is subsequently installed, thus allowing processing unit 210 to correctly determine that the data within non-volatile memory device 206 is to be removed.

As an alternative to utilizing charge pump 207 to maintain the "set" binding latch state, processing unit 210 can be programmed to interpret a logic low as the set state of binding latch 208. In such a case, a delay device 212 may be incorporated within the battery signal line between battery 215 and binding pin 211 such that upon a subsequent installation of detachable TPM module 204, the resetting battery signal is delayed long enough for processing unit to have detected the logic low set state and to remove the data from non-volatile memory unit 206 in response.

As described with reference to FIG. 2, the logical binding apparatus of the present invention may be advantageously applied to subsystems developed under guidelines set forth by the TCPA, and more specifically to protection of data stored on a TPM. However, the principles underlying logical binding technique disclosed herein are more widely applicable to subsystems designed to operate at a single physical location within a network environment.

Figure 3:
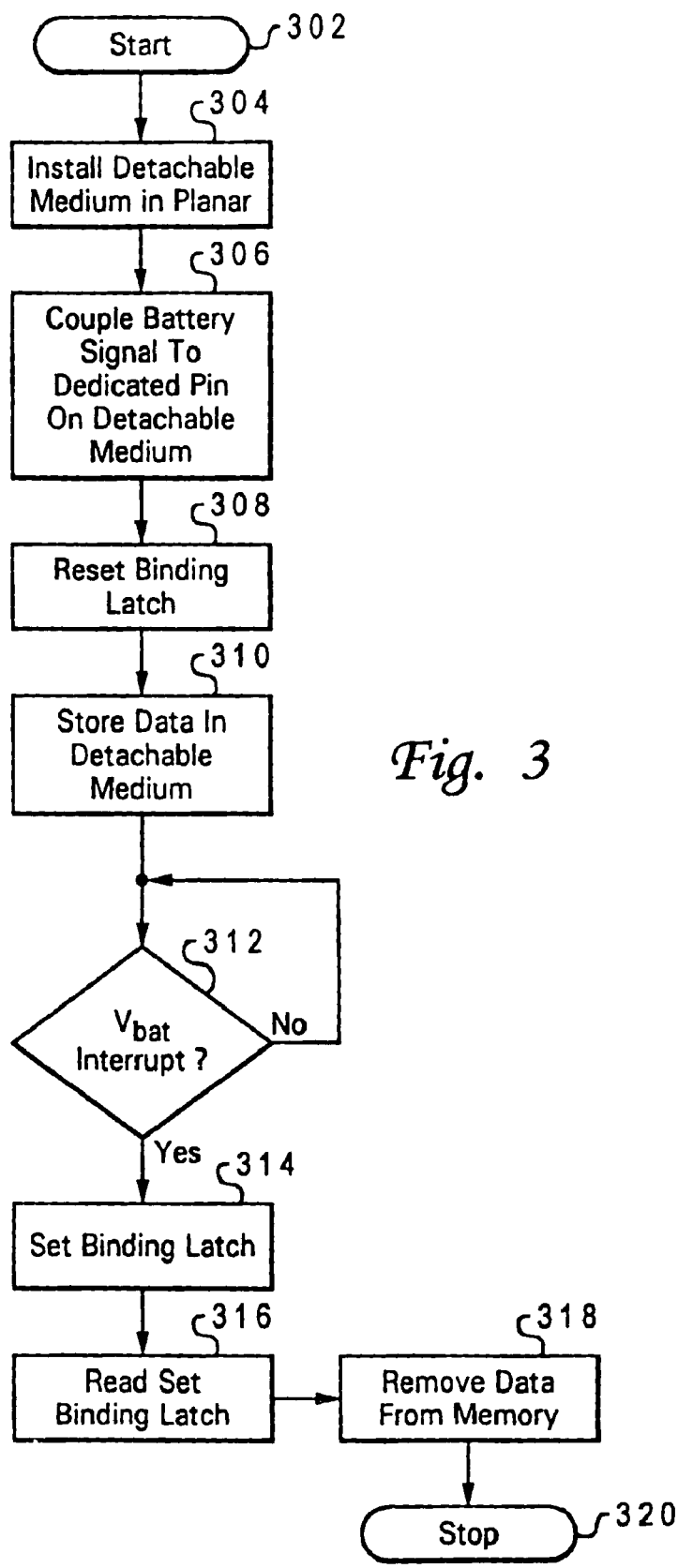
FIG. 3 is a high-level flow diagram depicting steps performed for implementing and utilizing the logical binding apparatus depicted in FIG. 2 in accordance with a preferred embodiment of the present invention.

With reference to FIG. 3, there is illustrated a high-level flow diagram depicting steps performed for implementing and utilizing the logical binding apparatus depicted in FIG. 2 in accordance with a preferred embodiment of the present invention. The logical data binding process begins as shown at step 302 and proceeds to step 304 with the original installation of a detachable medium (e.g. detachable TPM module 204) into a system planar (e.g. system planar 202). Proceeding to step 306, the battery signal, $V_{bat}$, is applied through a signal line from battery 215 within system planar 202 to binding pin 211 on detachable TPM module 204. When detachable TPM module is originally installed and $V_{bat}$ applied to binding pin 211, bind latch 208 is maintained in a reset state as depicted at step 308.

Proceeding to step 310, data, in the form of security keys or otherwise, is stored within non-volatile memory unit 206 as part of the normal operations of detachable TPM module 204. During such operation, and as depicted at step 312, a continuous determination is made of whether or not $V_{bat}$ has been interrupted. This determination is made on a continuous basis in accordance with the design of binding latch 208 which is designed to switch states (from reset to set) in response to removal of $V_{bat}$ from its input at binding pin 211.

As illustrated at step 314, in response to a removal of $V_{bat}$ from binding pin 211, binding latch 208 set. Next, processing unit 210 detects the setting of binding latch 208 and removes the data from nonvolatile memory unit 206 as depicted at steps 316 and 318. After the secure data has been removed, the logical binding process terminates as shown at step 320.

A method and system have been disclosed for logically binding data to a hardware platform. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for exclusively binding data to a data processing system comprising:
   a data storage device in which said data is stored;
   a battery that provides a binding signal independent of system power supplied to said data processing system;
   a binding latch that receives said binding signal, wherein said binding latch is set upon removal of said binding signal; and
   a charge pump within said detachable medium, wherein said charge pump supplies power to set said binding latch in response to removal of said detachable medium from said system planar.

2. The apparatus of claim 1, wherein said binding latch is a non-volatile storage device.

3. The apparatus of claim 1, wherein said data storage device is contained within a detachable medium within said data processing system.

4. The apparatus of claim 3, wherein said detachable medium is a circuit card or a module detachably mounted onto a system planar.

5. The apparatus of claim 3, further comprising a signal line connecting said binding signal from said battery to a sensing input on said detachable medium.

6. The apparatus of claim 3, further comprising:
   circuit means within said detachable medium for detecting the state of said binding latch; and
   circuit means within said detachable module, which, in response to detecting that said binding latch is set, removes said data from said data storage device.

7. A method for exclusively binding data to a data processing system comprising:
   detachably coupling a data storage device that stores said data within said data processing system wherein said data storage device is contained within a detachable medium within said data processing system, said detachable medium including a charge pump;
   providing a battery binding signal that is independent of system power supplied to said data processing system; and
   in response to removal of said battery binding signal;
      setting a non-volatile binding latch that indicates the removal of said battery binding signal; and
      supplying power from said charge pump to set said binding latch.

8. The method of claim 7, wherein said detachable medium is a circuit card or a module, said method further comprising detachably mounting said detachable medium onto a system planar.

9. The method of claim 7, further comprising connecting said binding signal from said battery to a sensing input on said detachable medium.

10. The method of claim 7, further comprising:
    detecting the state of said binding latch; and
    in response to detecting that said binding latch is set, removing said data from said data storage device.

11. The method of claim 10, wherein said detecting the state of said binding latch is processed by mounting said detachable medium into said data processing system or another data processing system.

12. An apparatus for exclusively binding data to a data processing system planar comprising:
    a data storage device contained within a detachable medium that is mounted onto the data processing system planar;
    a battery that provides a binding signal independent of system power supplied to operate said data processing system;
    a binding latch contained within the detachable medium that receives said binding signal, wherein said binding latch is set upon removal of said binding signal;
    a processing unit communicatively coupled to said binding latch, wherein responsive to detecting a binding latch set state, said processing unit removes data from said data storage device; and
    a charge pump within said detachable medium, wherein said charge pump supplies power to set said binding latch following removal of said detachable medium from said system planar.

13. The apparatus of claim 12, wherein said binding latch is a non-volatile storage device.

14. The apparatus of claim 12, wherein said detachable medium is a circuit card or a module detachably mounted onto the data processing system planar.

15. An apparatus for exclusively binding data to a data processing system planar comprising:
- a data storage device contained within a detachable medium that is mounted onto the data processing system planar;
- a battery that is mounted external to said detachable medium, said battery providing a binding signal independent of system power supplied to operate said data processing system;
- a signal line connecting said binding signal from said battery to a sensing input on said detachable medium;
- a binding latch contained within the detachable medium that receives said binding signal, wherein said binding latch is set upon removal of said binding signal; and
- a processing unit communicatively coupled to said binding latch, wherein responsive to detecting a binding latch set state, said processing unit removes data from said data storage device.

16. A method for exclusively binding data to a data processing system planar comprising:
- mounting a detachable medium onto a data processing system planar, wherein the detachable medium includes a non-volatile data storage device and a charge pump;
- applying a persistent binding signal from the system planar to a sensing input of the detachable medium, wherein the persistent binding signal is independent of system power supplied to operate the data processing system; and
- responsive to interruption of said binding signal at the sensing input;
    - switching the set state of a binding latch that is coupled to the sensing input of the detachable medium; and
- supplying power from the charge pump to set the binding latch following removal of the detachable medium from the system planar.

17. The method of claim 16, further comprising:
sensing the state of the binding latch; and
in response to detecting a binding latch set state, removing data from the non-volatile data storage device.

18. The method of claim 17, wherein said detecting a binding latch set state is processed responsive to mounting the detachable medium onto the data processing system planar or another data processing system subsequent to removing the detachable medium from the data processing system planar.

* * * * *